Feb. 16, 1926. Re. 16,262

C. W. LUMMIS ET AL

GAS PRODUCER

Original Filed May 21, 1914 3 Sheets-Sheet 1

Inventors.
Charles W. Lummis
George H. Isley
By Wm. A. Kennedy Jr.
Attorney

Feb. 16, 1926.

Re. 16,262

C. W. LUMMIS ET AL

GAS PRODUCER

Original Filed May 21, 1914 3 Sheets-Sheet 2

Inventors:
Charles W. Lummis
George H. Isley
By Wm. A. Kennedy Jr.
Attorney

Feb. 16, 1926. Re. 16,262

C. W. LUMMIS E. AL

GAS PRODUCER

Original Filed May 21, 1914 3 Sheets-Sheet 3

Inventors:
Charles W. Lummis
George H. Isley
By Geo. W. Kennedy Jr.
Attorney

Reissued Feb. 16, 1926. Re. 16,262

UNITED STATES PATENT OFFICE.

CHARLES W. LUMMIS AND GEORGE H. ISLEY, OF WORCESTER, MASSACHUSETTS, ASSIGNORS TO MORGAN CONSTRUCTION COMPANY, OF WORCESTER, MASSACHUSETTS, A CORPORATION OF MASSACHUSETTS.

GAS PRODUCER.

Original No. 1,251,064, dated December 25, 1917, Serial No. 840,110, filed May 21, 1914. Application for reissue filed July 13, 1923. Serial No. 651,413.

*To all whom it may concern:*

Be it known that we, CHARLES W. LUMMIS and GEORGE H. ISLEY, both citizens of the United States, residing at Worcester, in the county of Worcester and Commonwealth of Massachusetts, have invented a new and useful Improvement in Gas Producers, of which the following, together with the accompanying drawings, is a specification.

The present invention relates to gas producers, and in particular, to mechanism adapted for leveling the surface of the bed of fuel in a gas producer, and for agitating said surface to prevent the formation of solid masses of fuel by fusion, and the formation of openings in the bed of fuel.

The efficient operation of a gas producer is, in the main, dependent upon the maintenance, in the combustion chamber thereof, of a bed of fuel substantially homogeneous in character and of uniform thickness throughout, whereby the blast of air, or air and steam which is forced through the fuel to support the combustion thereof, may permeate the same uniformly and thoroughly, to maintain the combustion uniform. The ordinary methods of feeding fuel to a gas producer through a hopper contribute naturally to the formation of a more or less uneven bed of fuel upon the grate. Furthermore, the combustion of fuel in such a condition tends to render the fuel bed solid and substantially impenetrable in some portions, while other portions become more or less cellular in character, with a consequent serious loss of efficiency. The present invention contemplates the overcoming of these difficulties by the provision of a fuel leveling and agitating member which, by reason of constant relative movement between itself and the fuel bed, is made to traverse or to pass over said bed continuously, thereby being effective over substantially the entire area of said bed, and which, by reason of its mounting or support, is enabled to adjust itself automatically to changes in the level of said bed. Other objects and advantages will appear from the following description, taken in connection with the accompanying drawings, in which:—

Like reference characters refer to like parts in the different figures.

Figure 1:
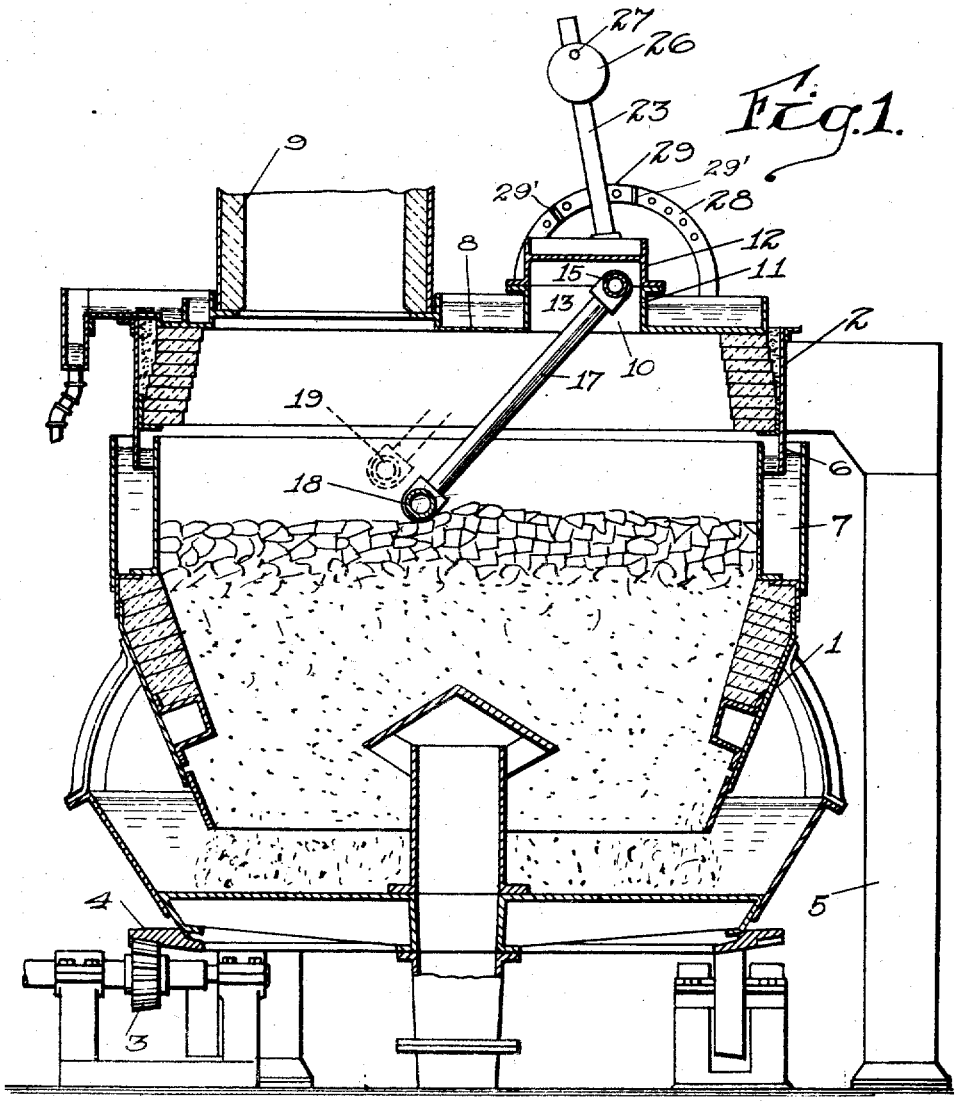
Fig. 1 is a vertical sectional view, on line 1—1 of Fig. 2, of a gas producer equipped with our invention.
Figure 2:
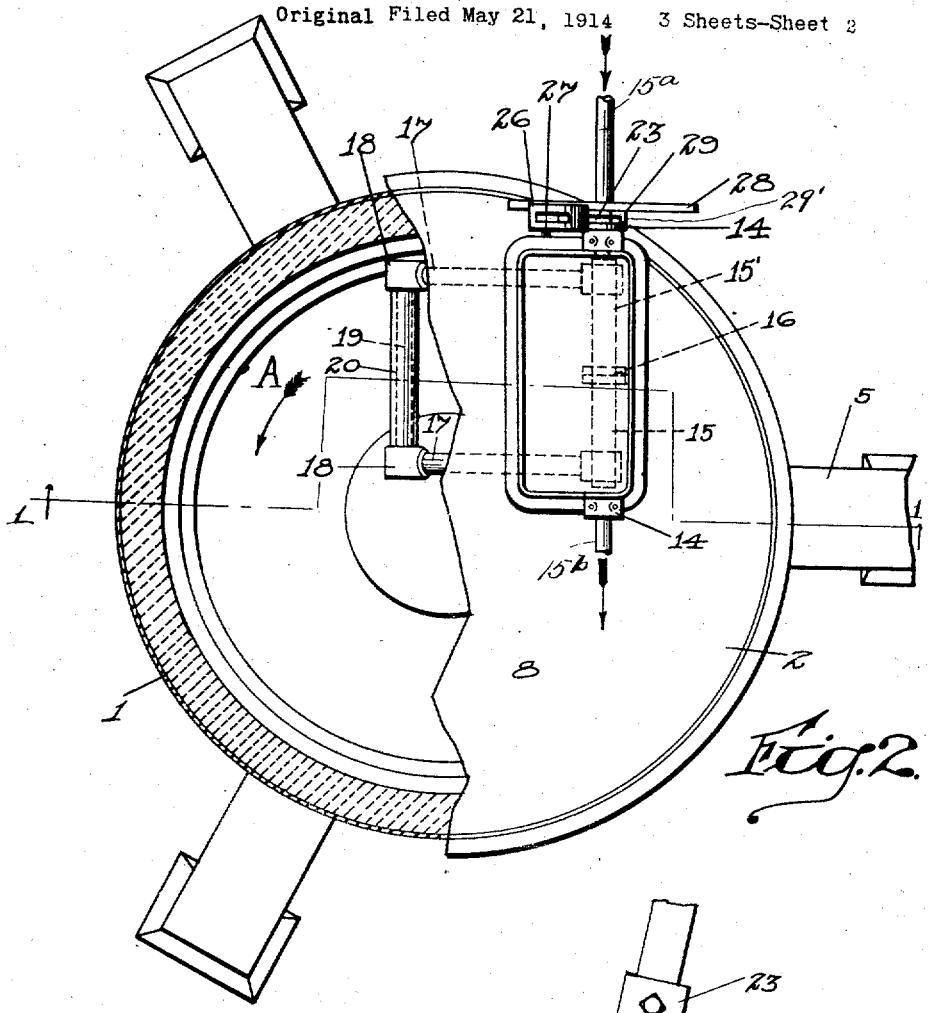
Fig. 2 is a plan view, partly in section, of the construction shown in Fig. 1.
Figure 3:
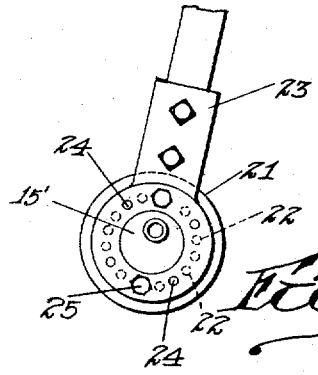
Fig. 3 is a detail view, in elevation of the outer end of the leveling and agitating member.

In the form of the invention shown in Figs. 1 and 2, the producer includes a rotatable fuel section 1, and a stationary section 2, the section 1 being rotated in any suitable manner as by a rack 3 and worm 4. The section 2 is supported above the section 1 by posts 5; the section 2 has a depending apron 6 which extends below the surface of the water in an annular chamber 7 formed in the wall of section 1 to provide a water seal against the escape of gas from the combustion chamber enclosed by said sections.

The section 2 is closed at the top by a cover plate 8, which is preferably provided with means for supporting a body of water, to prevent overheating. The cover plate 8 supports a suitable feeding device or hopper, not shown, by means of which fuel is fed into the generating chamber in any well known manner, and is also provided with a suitable outlet opening 9 for the egress of the gases generated in the generating chamber.

The cover plate 8 is formed with a rectangular opening 10, the longitudinal center line of which is offset from that diameter of the plate to which it is parallel, said opening being substantially equal in length to one half of a diameter of the plate. The walls 11 defining said opening are extended upwardly and flanged outwardly, to receive a similarly flanged cover 12 enclosing a chamber 13 forming an extension of the generating chamber of the producer. Alined bearings 14, 14, are mounted exteriorly of said chamber at each end thereof, and in said bearings are journaled the ends of hollow trunnions or shafts 15, 15′, passing through the ends of said chamber in the plane of the flanged joint between the walls 11 and cover 12. The trunnions 15 and 15′ are joined together within said chamber by an abutting flange joint 16, provided with an intermediate plate 16′, best shown in Fig. 5, which prevents direct communication between the trunnions. In other words, in the absence of plate 16′, cooling water introduced to one of the trunnions would pass directly into the other, but by the use of said plate 16′ said cooling water is diverted and caused to pass through the hollow sections 17, 17, and 19, as hereinafter described. Each trunnion has extending downwardly therefrom, near its outer end, a pipe section 17, in communication with its interior, and each pipe section carries at its lower end a coupling 18, said couplings 18 being connected by a pipe 19, which provides for a circulation of water from one trunnion to the other. Said pipe 19 is preferably protected by a tubular cover 20 extending between the couplings 18 and constituting the effective fuel agitating and leveling member of the present invention, adapted to bear upon and to level and agitate the bed of fuel in the fuel section 1. Provision is made for a constant circulation of cooling water through the entire pivoted structure above described, by connecting the ends of the trunnions 15 and 15′ to inflow and outflow water pipes $15^a$ and $15^b$ respectively, as shown in Fig. 2.

The trunnion 15′ beyond its bearing 14 has formed thereon a collar 21, which is provided with an annular series of equidistant bolt holes 22. An upwardly extending arm 23 is mounted on the end of said trunnion in abutting relation to said collar, said arm having an annular series of bolt holes 24 adapted to register with the corresponding holes 22 in different radial positions of said arm. Bolts 25 for holding said arm in various positions of adjustment with respect to the axial line of the trunnions are passed through said registering bolt holes. Said arm carries a weight 26, provided with a set screw 27 by means of which the weight is held in any desired position along the length of said arm, thus regulating, by adjustment of said weight, the pressure against the fuel bed, and hence the degree of penetration by the free end of the pivoted structure into the upper strata of fuel. In this connection, it is to be noted that the arrangement of parts in Fig. 1 is such that the arm 23 and legs 17 are on the same side of a line passing vertically through the axis of the trunnions 15, 15′, so that said arm and its weight 26 tend to force the free end of the pivoted structure into the fuel bed; the opposite effect is produced when the arm 23 is arranged on the other side of said vertical line from the legs 17. Extending upwardly from the cover plate 8 adjacent the arm 23 is a segmental member 28, having formed therein a plurality of equidistant radially arranged holes. A shorter segmental member 29, having its ends 29′, 29′ bent at right angles, is adapted to be secured to the face of member 28 in any one of a number of positions as determined by said holes, the two bent sides or ends 29′, 29′, of said member thereby forming spaced stops to limit the movement of the arm 23 in each direction.

As shown in Figs. 1 and 2, the fuel section 1 rotates in a counterclockwise direction, thus carrying all portions of the surface of the fuel bed into contact with the free end 20 of the pivoted member, which free end is offset from the axis of the trunnions 15, 15′, in the same direction as that in which the fuel bed moves. This rotation of the fuel bed therefore causes said free end 20 to have a passage over or traverse, relative to substantially the entire area of the fuel in the section 1, and while such traverse or passage over is here shown as effected by a counterclockwise rotation of said section 1, it obviously could as well be effected by clockwise rotation of the cover section 2 which carries the pivoted member; in either case, the result is to subject the entire area of the fuel bed to the action of our device, which, in consequence of the pressure exerted by its own weight, augmented to a greater or less degree by the adjustable weight 26, is effective to produce the desired agitation of the upper strata of fuel, and the spreading and leveling of fresh fuel as introduced from time to time to the gas generating chamber of the producer.

Upon the introduction of fresh fuel to the producer, the tendency of said fuel to embed the member 20 causes an increased resistance to the fuel traversing action between said member and the fuel bed, over and above the normal resistance to said traverse, and a similar increase of the resistance also occurs when a large clinker, or other obstruction, comes into contact with member 20. Any such increased resistance to the traverse, regardless of its causes, produces increased lateral or sidewise pressures on said member 20, which pressures are here utilized, in a highly advantageous manner, as hereinafter described, to automatically raise said member to a position where normal traversing conditions will again prevail.

Previous efforts to make other fuel traversing members self-adjusting, by attempting to have them rise in response to vertical components of such increased lateral or sidewise pressures, have not been able to overcome satisfactorily the difficulties arising from forces acting in opposition to such desired rising movement, which forces are set up in some cases by the non-vertical components of said pressures, and in other cases by the members themselves. For instance, in the device of the Jefferies Patent No. 1,251,038, the fuel traversing member, being laterally rigid and unyielding, must absorb in its sliding suspension rods all the essentially horizontal components of said pressures, and hence said member must be severely handicapped, in its ability to be wedged upwardly, by the tendency of said rods to bind in their supports. The same thing is essentially true of the device of Climie Reissure Patent No. 15,057, where the fuel traversing member, which is incapable of any lateral or sidewise movement except at the fixed speed of rotation imparted by its driving shaft, will have any upward tendency very strongly resisted by binding or excessive friction between said shaft and said member, due to the horizontal pressures acting on the latter. And in the device of Jefferies Patent No. 1,251,039, while increased lateral or sidewise pressures on one half of the fuel traversing member have a tendency to raise it, yet these selfsame pressures acting on the other half of said member thrust it deeper and deeper into the fuel bed, so that for all practical purposes, the two halves of the member work in direct opposition to each other.

In our device as herein described, the mounting of the member 20 allows said member, in the event of increased lateral pressures thereon, to yield horizontally, throughout its entire length, in the direction in which such pressures thereon are exerted, as indicated by the broken lines in Fig. 1, and said mounting at the same time constrains said member, in so yielding, to swing vertically to a higher position, as also indicated by the broken lines in Fig. 1. No forces in opposition to this upward movement are developed by the lateral or sidewise pressures, but on the contrary, said pressures are all made directly contributory to said movement, and hence the member 20 readily and automatically reestablishes itself at a level where the forces are again in balance. This active sidewise and upward response of the member 20 to increased lateral pressures is in consequence of rotative reaction on the part of said member to turning moments developed by said pressures and all acting in the same direction, with reference to the axis on which the member swings, to move said member in an upwardly curving path,—the rate of horizontal displacement between said member and the fuel undergoing a reduction during this movement. The result is a virtual flotation or maintenance of member 20 in a substantially constant relation to the surface of the fuel bed, regardless of the raising or lowering of said surface from time to time in the operation of the producer;—since it is apparent that any lowering of the surface results in the lowering of member 20 by gravity in a downwardly curving path.

Figure 4:
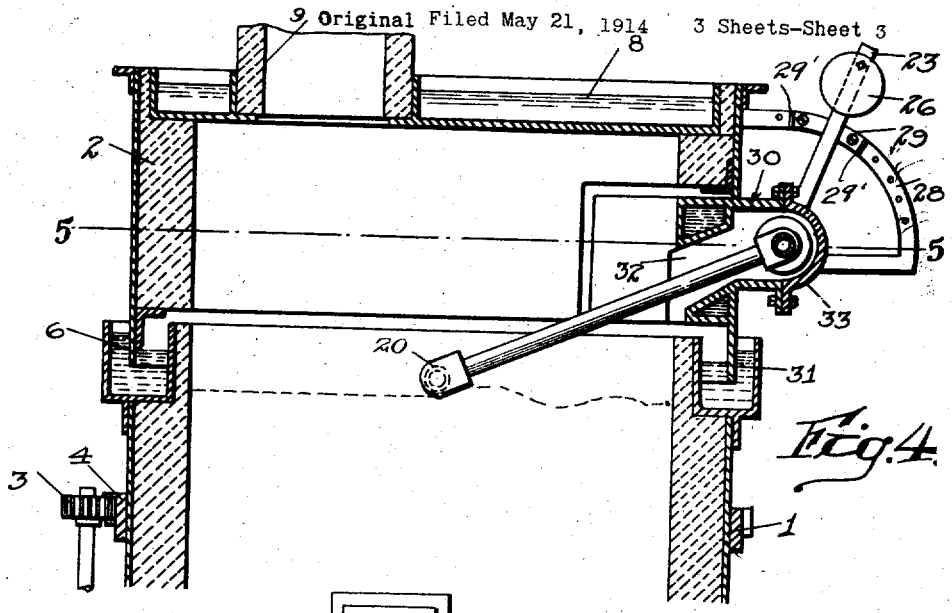
Fig. 4 is a fragmentary vertical sectional view, on line 4—4 of Fig. 5, of a gas producer equipped with a modified form of our invention.
Figure 5:
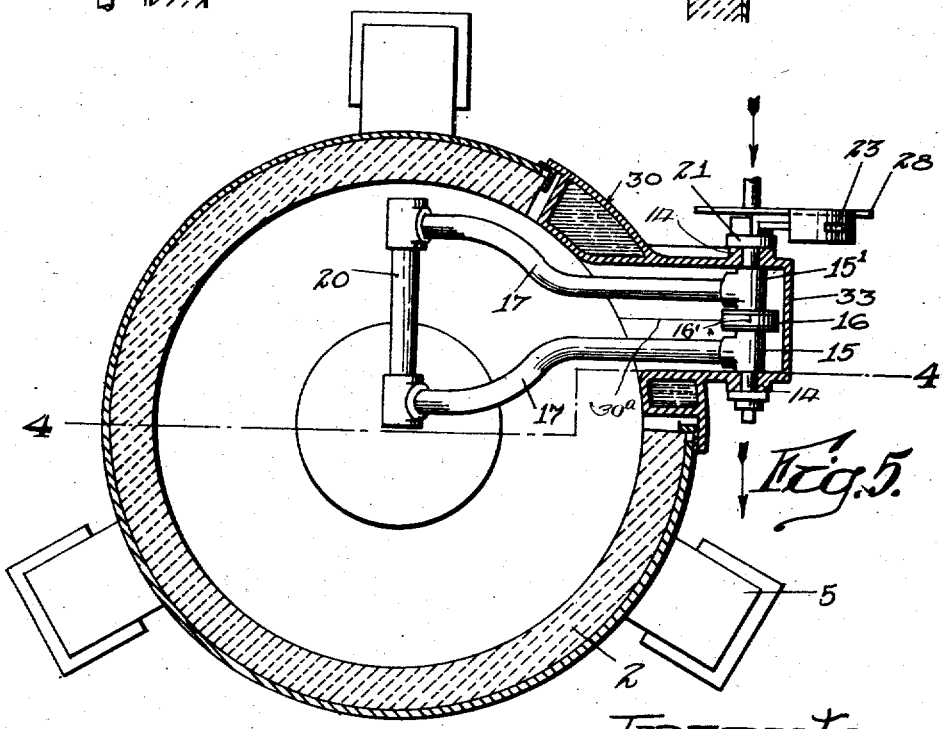
Fig. 5 is a horizontal section on line 5—5 of Fig. 4.

In the modification shown in Figs. 4 and 5, the side wall of the upper section 2 of the producer has formed therein a segmental opening of sufficient circumferential length to permit the insertion and withdrawal therethrough of a leveling and agitating device, substantially identical in construction with the device described in connection with Figs. 1 and 2. A water cooled casting 30, conforming substantially to the shape of said opening is detachably secured therein to close the same, said casting having a depending flange 31 forming an extension of the water seal apron 6 of the upper section. The water cooled casting 30 provides an opening 32, for the accommodation of the outer ends of the pipe sections or legs 17 which connect the member 20 with its trunnions 15, 15′. The latter are journalled in bearings formed in part by outward extensions of the walls of the casting 30 and in part by a detachable bearing cap 33, which closes the outer end of opening 32. The casting 30 is split vertically, as indicated by the line 30ª, Fig. 5, to permit the assemblage of the parts therein. The details of construction of the trunnions of the device are substantially the same as in the first described form, provision being made for the radial adjustment of a weighted arm 23 with respect to the axial line of the trunnions, and suitable adjustable stops being provided to limit the movement of said arm in each direction.

The operation of the last described form of the invention is identical with the operation of the form shown in Figs. 1 and 2; in both forms, the devices are readily removable for replacement or repair, being rendered accessible by removal of the cover 12, and the water cooled casting 30, respectively. It is obvious that in each form of the invention described, the upper section 2 may be rotated with respect to the fuel section 1, carrying the member 20 over the surface of the fuel contained in the latter to effect the desired agitation and smoothing thereof. It is desirable, in the operation of a gas producer, that the variation of the level of the fuel therein should be limited, and in practice, the range of such variations should not be over fifteen or eighteen inches. The stops formed by the bent ends 29′, 29′, of the member 29, are spaced to permit a movement of the arm 23 corresponding approximately to the desired range of vertical movement of the member 20, in response to changes in the level of the fuel. Therefore, when the arm 23 engages or approaches the left hand stop of the member 29, it is an indication that the level of the fuel in the producer has fallen too low, and when the arm 23 engages the right hand stop, the operator is informed that the upper limit of the level of the fuel in the producer has been reached. In the form shown in Figs. 4 and 5, the disposition of the member 20 is such that the arm 23 lies on the opposite side from the legs 17 of a line passing vertically through the axis of trunnions 15 and 15′; under these conditions, as distinguished from the arrangement of parts shown in Figs. 1 and 2, the tendency of said arm and its weight 26 is to partially counterbalance the pressure of the free end 20 of the levelling device against the fuel bed.

We claim,

1. In a gas producer, a fuel containing section, a levelling and agitating member for the fuel bed in said section, means for producing a relative traversing movement between said fuel bed and said member, to subject said bed over substantially its entire area to the action of said member, the latter being subjected by said traverse, over its entire length, to pressures acting similarly thereon, and a mounting for said member to permit it to yield sidewise to said pressures in adjusting itself vertically to an increased resistance to said traverse.

2. In a gas producer, a fuel containing section, a levelling and agitating member for the bed of fuel in said section, means for producing a relative traversing movement between said member and the bed of fuel, to subject said bed over substantially its entire area to the action of said member, said member being yieldably mounted and being subjected by said traverse to pressures that, over the entire length of said member, are similarly conducive to its sidewise yield, and means to constrain said yield to an upwardly curved path.

3. In a gas producer, a fuel section, a pivoted levelling and agitating member having its free end maintained by gravity in contact with the bed of fuel in said section, means for producing a rotative traverse between said bed and said free end, to subject said bed, throughout its area, to the levelling and agitating action of said free end, the latter for its entire length being offset from its pivotal axis in the same direction as the traverse of the fuel therebeneath, whereby it is free to respond, by movement about said axis to turning moments set up by resistance to said traverse.

4. In a gas producer, a fuel containing section, a levelling and agitating member for the bed of fuel in said section, means for producing a relative traversing movement between said fuel bed and said member, to subject said bed over substantially its entire area to the action of said member, the latter being subjected by said traverse, over its entire length, to similarly acting turning moments, and a mounting for said member providing an axis whereon it is free to swing in response to such turning moments.

5. In a gas producer, a fuel container section, a levelling and agitating member for the bed of fuel in said section, means for producing a rotative horizontal traverse between said bed and said member, to subject said bed over substantially its entire area to the levelling and agitating action of said member, the latter being maintained by gravity in contact with the fuel bed, and means constraining said member's reaction to increased fuel traversing resistance to a movement, which for the entire length of said member reduces the rate of displacement, by said traverse, between said member and the fuel bed.

6. In a gas producer, a fuel containing section, a levelling and agitating member for the bed of fuel in said section, means for producing a relative traversing movement between said member and said fuel bed, to subject said bed over substantially its entire area to the action of said member, and a mounting for said member to permit automatic vertical adjustment thereof, said mounting constraining said adjustment to a movement of said member for its entire length in the same direction as that which said traverse causes the fuel bed to take, relative to said member.

7. In a gas producer, a fuel section and an upper section, the latter providing a cover, a levelling and agitating member pivotally suspended from said cover and having its free end supported upon the surface of the bed of fuel in said fuel section, and means for causing relative rotation between said fuel section and said cover.

8. In a gas producer, a fuel section and an upper section, the latter providing a cover having an opening therethrough, a levelling and agitating member supported at one end on the surface of the bed of fuel in said fuel section and having its other end extended through said opening and pivoted to said cover, a detachable closure for said opening, and means for causing relative rotation between said fuel section and said cover.

9. In a gas producer, a fuel section and an upper section, the latter provided with a cover having an opening therethrough, a fuel levelling member pivotally supported by said cover, with its free end resting by gravity on the fuel in said fuel section, said member being removable through said opening, and means for causing relative rotation between said fuel section and said cover.

10. In a gas producer, a shell inclosing a gas producing chamber, said shell having an opening therethrough, a levelling member pivoted in said opening and having its free end adapted to rest by gravity on the fuel in said chamber at one side only of the producer center, said member being removable through said opening, and means for causing relative traversing movement between said member and said bed of fuel.

11. A gas producer having a U-shaped agitator, its ends mounted to swing at the top of the producer and its bend playing freely against the coal at one side only of the producer center, and means for causing relative horizontal motion between the agitator and the coal.

Dated this eleventh day of July, 1923.

CHARLES W. LUMMIS.
GEORGE H. ISLEY.